United States Patent [19]
English et al.

[11] Patent Number: 5,528,593
[45] Date of Patent: Jun. 18, 1996

[54] METHOD AND APPARATUS FOR CONTROLLING POWER IN A VARIABLE RATE COMMUNICATION SYSTEM

[75] Inventors: Sean English, Del Mar; Andrew P. DeJaco, San Diego, both of Calif.

[73] Assignee: Qualcomm Incorporated, San Diego, Calif.

[21] Appl. No.: 316,168

[22] Filed: Sep. 30, 1994

[51] Int. Cl.$^6$ ................................. H04Q 7/30
[52] U.S. Cl. ................ 370/84; 455/33.1; 379/59
[58] Field of Search .............. 370/84, 112, 110.1; 375/200, 205; 455/69, 33.1, 70, 54.1, 33.2; 380/34; 341/61; 379/59, 60

[56] References Cited

U.S. PATENT DOCUMENTS

| | | | |
|---|---|---|---|
| 4,658,436 | 4/1987 | Hill | 380/31 |
| 5,289,459 | 2/1994 | Brownlie | 370/17 |
| 5,341,396 | 8/1994 | Higgins et al. | 375/1 |
| 5,396,516 | 3/1995 | Padovani et al. | 375/225 |

Primary Examiner—Benedict V. Safourek
Assistant Examiner—Ajit Patel
Attorney, Agent, or Firm—Russell B. Miller; Sean English

[57] ABSTRACT

A method and apparatus for controlling transmission power in a variable rate communication system is disclosed. The method disclosed provides for a closed loop power control method. A first remote station controls the transmission power of a second remote station by transmitting a rate dependent power control signal to the second remote communication station. Since only the second communication knows its transmission rate a priori, it must determine its course of action in accordance with both the received power control signal and the knowledge of its transmission rate. In the present invention, the power control system reduces the amount of overhead required by restricting the possible rate transition of the variable rate communication system. The power control system further increases its efficiency by allocating the power control bits top various rate hypotheses in accordance with the probability of the rate hypothesis and the perceptual impact of power control for frames of data transmitted at the hypothetical rate.

25 Claims, 4 Drawing Sheets

METHOD AND APPARATUS FOR CONTROLLING POWER IN A VARIABLE RATE COMMUNICATION SYSTEM

BACKGROUND OF THE INVENTION

I. Field of the Invention

The present invention relates to communication systems. More particularly, the present invention relates to a novel and improved method and apparatus for controlling transmission power in a variable rate communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

A method for transmission of speech in digital communication systems that offers particular advantages in increasing capacity while maintaining high quality of perceived speech employs variable rate speech encoding. The method and apparatus of a particularly useful variable rate speech encoder is described in detail in copending U.S. patent application Ser. No. 08/004,484, which is a continuation application of U.S. patent application Ser. No. 07/713,661, filed Jun. 11, 1991, entitled "VARIABLE RATE VOCODER", assigned to the assignee of the present invention, of which the disclosure thereof is incorporated by reference herein.

The use of a variable rate speech encoder provides for data frames of maximum speech data capacity when said speech encoding is providing speech data at a maximum rate. When a variable rate speech coder is providing speech data at a less that maximum rate, there is excess capacity in the transmission frames. A method for transmitting additional data in transmission frames of a fixed predetermined size, wherein the source of the data for the data frames is providing the data at a variable rate is described in detail in copending U.S. patent application Ser. No. 08/171,146, which is a continuation application of U.S. patent application Ser. No. 07/822,164, filed Jan. 16, 1992, entitled "METHOD AND APPARATUS FOR THE FORMATTING OF DATA FOR TRANSMISSION", assigned to the assignee of the present invention, of which the disclosure thereof is incorporated by reference herein. In the above mentioned patent application a method and apparatus is disclosed for combining data of differing types from different sources in a data frame for transmission.

In frames containing less data than a predetermined capacity, power consumption may be lessened by transmission gating a transmission amplifier such that only parts of the frame containing data are transmitted. Furthermore message collisions in a communication system may be reduced if the data is placed into frames in accordance with a predetermined pseudorandom process. A method and apparatus for gating the transmission and for positioning the data in the frames is disclosed in U.S. patent application Ser. No. 08/194,823, which is a continuation application of U.S. patent application Ser. No. 07/846,312, filed Mar. 5, 1992, entitled "DATA BURST RANDOMIZER", assigned to the assignee of the present invention, of which the disclosure thereof is incorporated by reference herein.

A useful method of power control of a mobile in a communication system is to monitor the power of the received signal from the mobile station at a base station. The base station in response to the monitored power level transmits power control bits to the mobile station at regular intervals. A method and apparatus for controlling transmission power in this fashion is disclosed in U.S. Pat. No. 5,056,109, issued Oct. 8, 1991, entitled "METHOD AND APPARATUS FOR CONTROLLING TRANSMISSION POWER IN A CDMA CELLULAR TELEPHONE SYSTEM", assigned to the assignee of the present invention, of which the disclosure thereof is incorporated by reference herein.

In an alternative continuous transmission strategy, if the data rate is less than the predetermined maximum the data is repeated within the frame such that the data occupies the full capacity of the data frame. If such a strategy is employed, power consumption and interference to other users may be reduced during periods of data transmission at less than the predetermined maximum by reducing the power at which the frame is transmitted. This reduced transmission power is compensated by the redundancy in the data stream and can offer benefits in range for a fixed maximum transmission power.

In the exemplary embodiment, a variable rate communication signal is transmitted between a base station and a mobile station. The variable rate signal of the exemplary embodiment is transmitted at one of four possible rates. The rates are referred to as full rate, half rate, quarter rate and eighth rate. In systems where the transmission power of the signal is dependent upon the rate of the signal, a problem arises in determining the adequacy of the received variable rate signal.

One possible method for controlling transmission power in a communication system that varies transmission power in accordance with the rate of the signal being transmitted is for the system of the receiving end to send back to the transmitting device a bit indicating the adequacy of the received signal power for each possible rate. In a system that has four possible rates, this would entail transmitting four bits of power control information per power control group, where each bit corresponds to the adequacy of the received signal power for a different rate hypothesis. This power control method would present an unacceptable impact on system capacity. There is a need for a more efficient method of power control in continuous transmission variable rate communication systems.

SUMMARY OF THE INVENTION

The present invention is a novel and improved method and apparatus for closed loop transmission power control in a continuous transmission variable rate communication system. It is an object of the present invention to provide timely power control that is necessary to provide robust communication link quality under fast fading conditions. It is noted that the different methods for power control can be changed by exchanging of signaling data in the course of the transmission. Such changes in power control format may be desirable in response to changes in channel characteristics or changes in the service be accommodated.

In the present invention, there are two closed loop power control techniques presented to provide a more efficient power control system. In a first technique, rate transitions are restricted in the variable rate transmissions. For example, if the previous frame was transmitted at one rate, then the current frame can only be one of a subset of rates determined by the rate transition restrictions. By reducing the possible rates of the current frame, by restricting the possible rate transition from the previous frame, one reduces the amount of power control information that needs to be transmitted. By restricting possible transitions from each rate to a fixed number of possible rates, the number of power control bits that need to be transmitted may be reduced.

In a second technique, the number of power control bits used to indicate rate control for a given rate hypothesis is based on a combination of the probability of the frame being transmitted at that rate and is also based on the perceptual effects of power control for the different rates. For example, in the situation that the previous frame was a full rate frame and the current frame may be a full rate frame or a half rate frame, it is possible to efficiently allocate the bits transmitted based upon the probability of the current frames rate hypothesis. If it is much more likely that the current frame is a full rate frame than it is that the current frame is a half rate frame, then it is more efficient to allocate more power control bits to the rate hypothesis of a full rate frame than to a half rate frame.

An alternative basis for allocating rate control bits to different rate hypotheses is based on the perceptual effects. For example, if power control has a greater perceptual impact on frames transmitted at a first rate than for frames transmitted at a second rate, then the performance of the communication system can be improved by allocating more power control bits to the more sensitive rate hypothesis than to the less sensitive rate hypothesis. By combining the two power control bit techniques described above a maximally efficient allocation of power control bits can be achieved.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
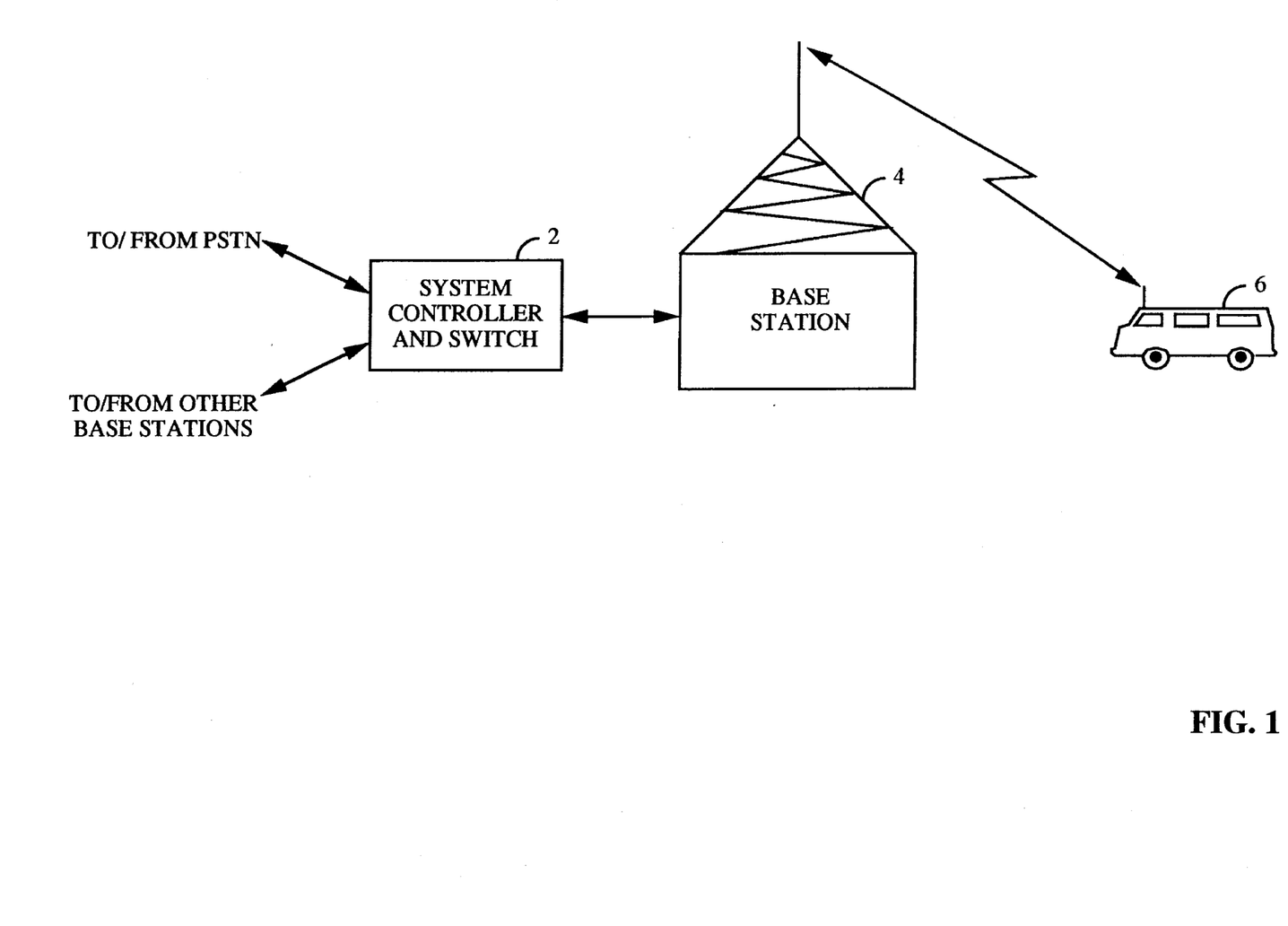
FIG. 1 is an illustration of an exemplary mobile telephone system.

Referring to FIG. 1, information may be provided to and from a public switching telephone network (PSTN) to system controller and switch 2, or may be provided to and from controller and switch 2 by another base station if the call is a mobile station to mobile station communication. System controller and switch 2, in turn, provides data to and receives data from base station 4. Base station 4 transmits data to and receives data from mobile station 6.

In the exemplary embodiment the signals transmitted between base station 4 and mobile station 6 are spread spectrum communication signals, the generation of the waveforms of which are described in detail in the above-mentioned U.S. Pat. No. 4,901,307 and U.S. Pat. No. 5,103,459. The transmission link for communication of messages between mobile station 6 and base station 4 is referred to as the reverse link and the transmission link for communication of messages between base station 4 and mobile station 6 is referred to as the forward link.

Figure 3:
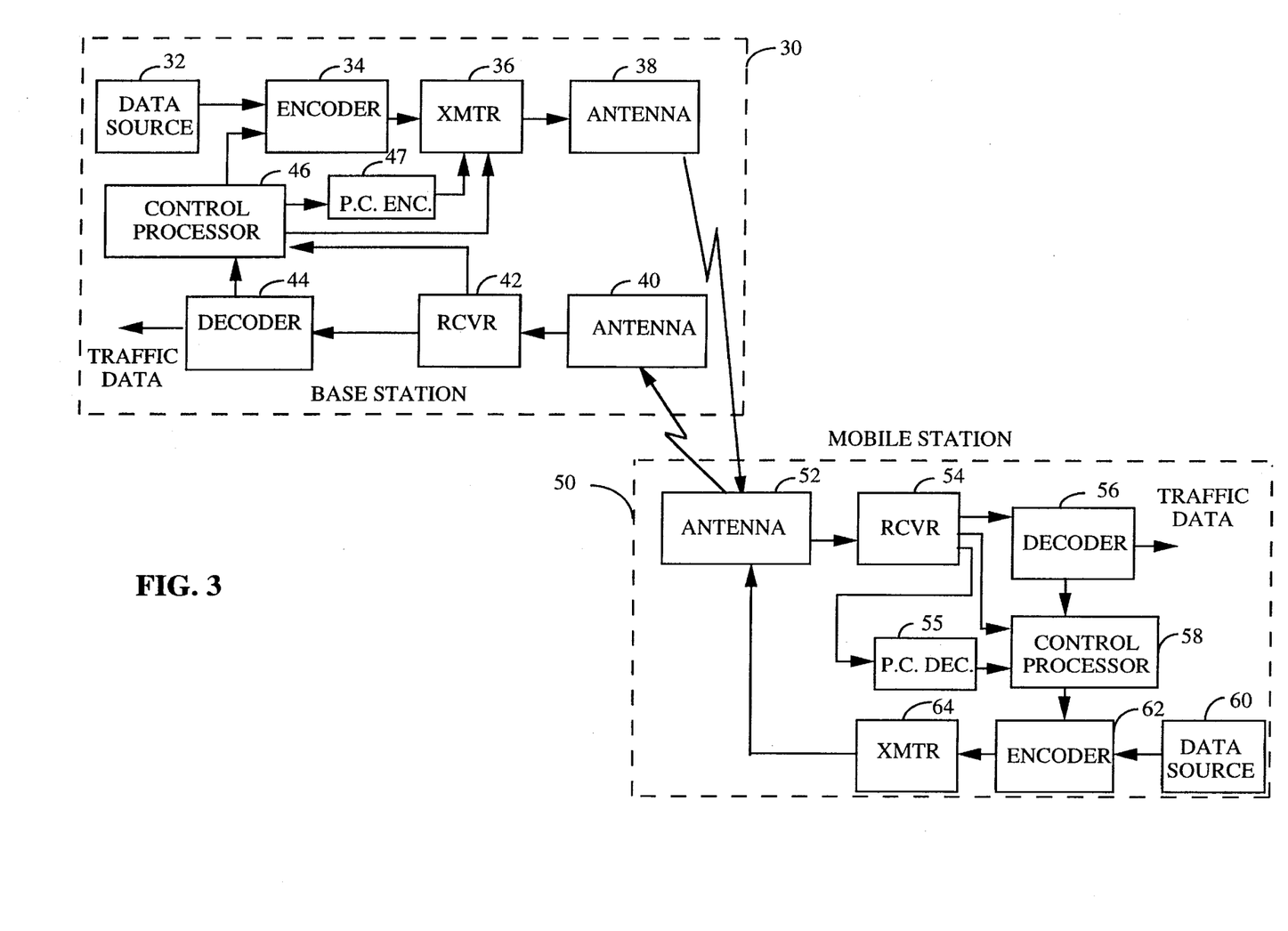
FIG. 3 is an illustration of the apparatus of the present invention.

In the exemplary embodiment, the present invention is used to control the transmission power of mobile station 6. However, the methods of power control of the present invention are equally applicable to controlling the transmission power of base station 4. Referring to FIG. 3, base station 30 and mobile station 50 are illustrated in block diagram form showing the apparatus for providing control of the transmission power of mobile station 50 of the present invention.

Figure 2A:
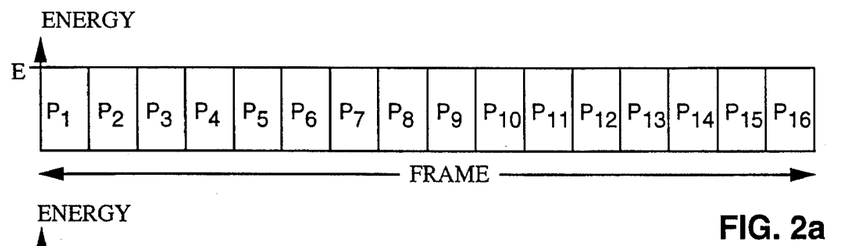
FIGS. 2a–k are illustrations of frame formats of the prior art reverse link and of the frame formats for frames of the present invention.

In conventional reverse link implementations, frames of variable rate data are transmitted from a mobile station to a base station using transmission gating when the data of transmission frames is less than a predetermined maximum. FIGS. 2a–g illustrates an exemplary frame structure for a transmission gated communication link. FIG. 2a illustrates a frame of full rate data comprised of 16 unique power control groups ($P_1$–$P_{16}$) of transmission data.

Figure 2B:
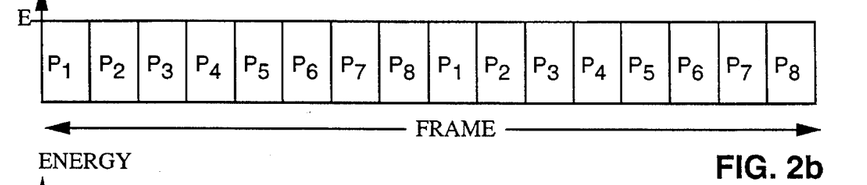
Figure 2C:
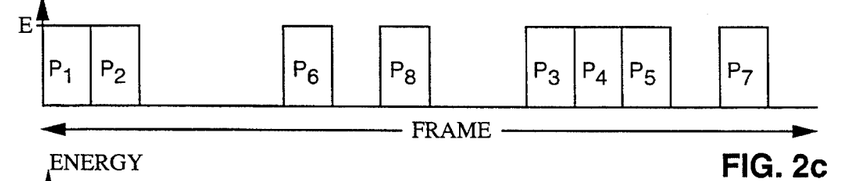

FIGS. 2b–c illustrate a transmission frame of half rate data. Half rate data only requires half of the capacity of the data frame. The data is then provided in duplicate as illustrated in FIG. 2b, with each unique power control group ($P_1$–$P_8$) provided twice in the frame. This repetition frame is provided to a gating means that gates out half of the power control groups so that only one unique version of each power control group is transmitted as illustrated in the transmission frame of FIG. 2c.

Figure 2D:
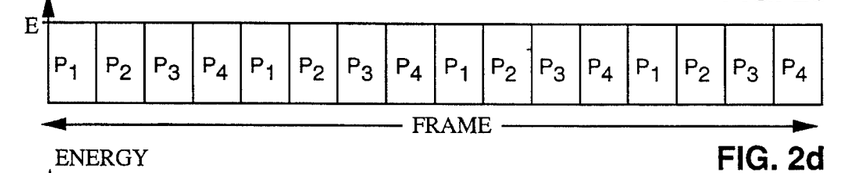
Figure 2E:
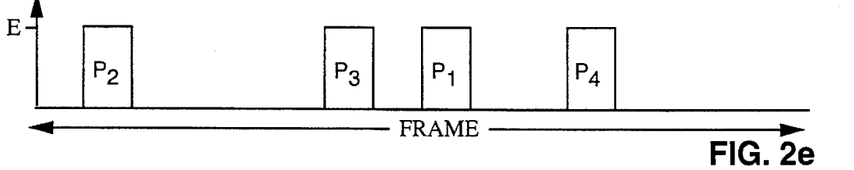

FIGS. 2d–e illustrate a transmission frame of quarter rate data. Quarter rate data only requires one quarter of the capacity of the data frame. The data is replicated four times as illustrated in FIG. 2d, with each unique power control group ($P_1$–$P_4$) provided four times in the frame. This repetition frame is provided to a gating means that gates out three fourths of the power control groups so that only one unique version of each power control group is transmitted as illustrated in the transmission frame of FIG. 2e.

Figure 2F:
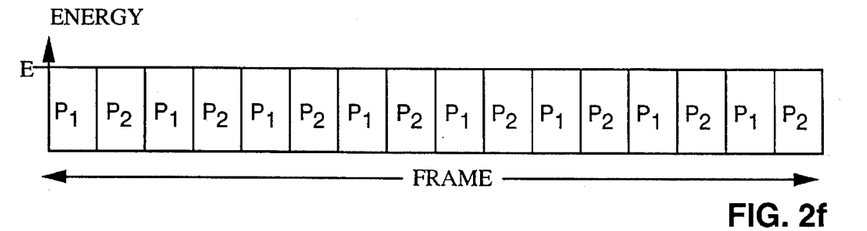
Figure 2G:
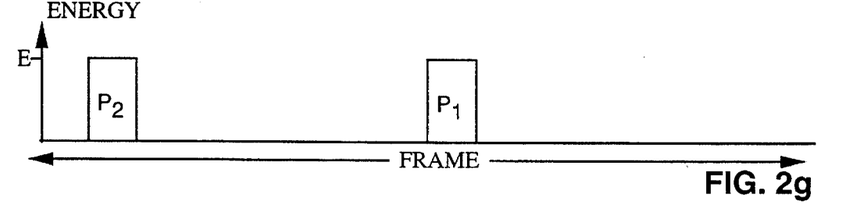

FIGS. 2f–g illustrate a transmission frame of eighth rate data. Eighth rate data only requires one eighth of the capacity of the data frame. The data is provided as eight duplicates as illustrated in FIG. 2f, with each unique power control group ($P_1$–$P_2$) provided eight times in the frame. This repetition frame is provided to a gating means that gates out seven eighths of the power control groups, so that only one version of each unique power control group is transmitted as illustrated in the transmission frame of FIG. 2g.

Power control, in systems where frames are transmitted as illustrated in FIGS. 2a–g, is provided by comparing the received power of each power control group against a predetermined power threshold and transmitting a single bit in return indicative of the power received being too high or too low. Since the mobile station is aware of which of the power control groups were gated out, it ignores the power control messages sent for gated out power control groups.

In the communication link of the present invention, repetition of the data in power control groups is provided as described in relation to FIGS. 2b, 2d and 2f. It should be noted that the ordering of the power control groups of the frames in FIGS. 2b, 2d and 2f is for exemplary purposes and that the present invention applies equally to any power control group ordering. In the present invention, gating of the redundant data is not performed, rather the entire repetition frame is transmitted, but with the transmission power decreased proportionally to the amount of redundancy existing in the transmission frames.

Figure 2H:
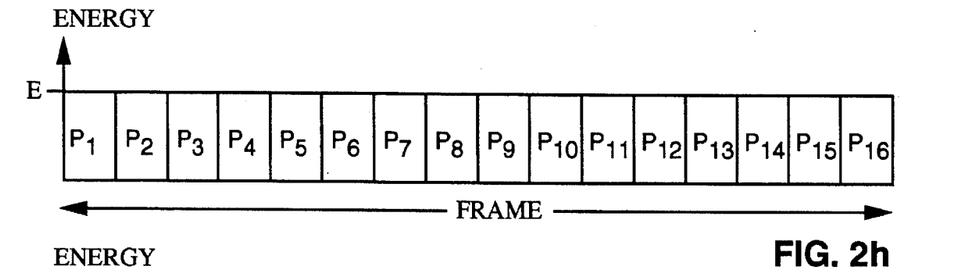
Figures 2I, 2J:
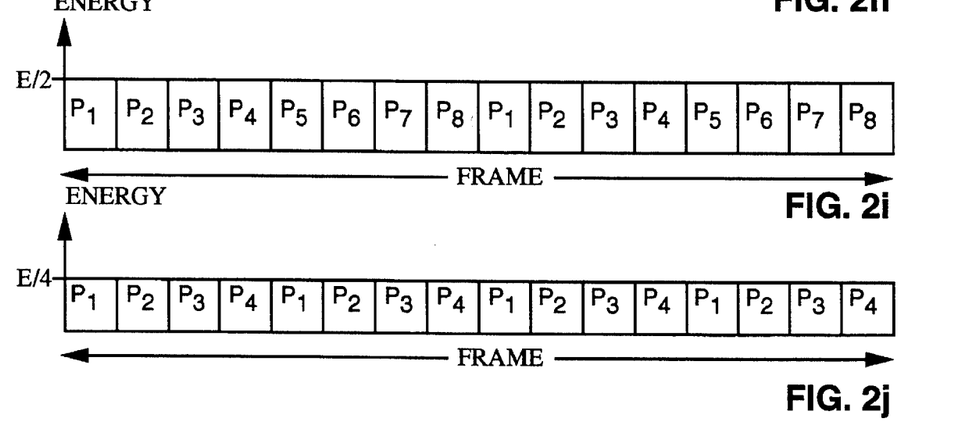
Figure 2K:
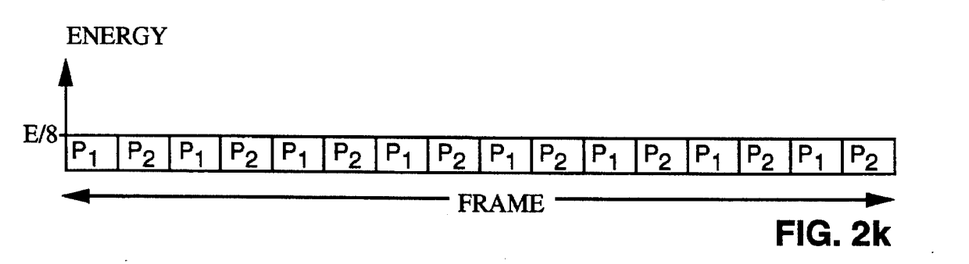

The exemplary transmission frames of the present invention are illustrated in FIGS. 2h–2k. It should be noted that the present invention applies equally to any ordering of the power control groups in transmission frames. In FIG. 2h, a full rate frame is illustrated. There are sixteen unique power control groups of data which occupy the entire capacity of the data frame and which are transmitted at a highest transmission power level. In FIG. 2i a half rate frame is illustrated. There are eight unique power control groups of data with a repetition rate of two and which are transmitted at approximately one half of the highest transmission power level. In FIG. 2j, a quarter rate frame is illustrated. There are four unique power control groups with a repetition rate of four and which are transmitted at approximately one quarter of the highest transmission power level. In FIG. 2k, an eighth rate frame is illustrated. There are two unique power control groups with a repetition rate of eight which are transmitted at approximately one eighth of the maximum transmission power level.

The transmission power can be reduced without degrading the link quality in the transmission of repetition frames by taking advantage of the redundancy by coherently or noncoherently combining the repeated signals and by taking advantage of forward error correction techniques available in the correction of data frames containing redundancy, which are well known in the art.

In this transmission scheme, power control is significantly more complicated if the receiver does not know the rate a priori at which the data is being transmitted. As illustrated in FIGS. 2h–2k, the adequacy of the received power depends entirely on the rate at which the data was transmitted, information which the receiver does not know a priori. The following describes methods by which power control can be implemented in a communication system of this type.

Referring to FIG. 3, in a closed loop power control system, power control signals are provided from base station 30 to mobile station 50. The method by which base station 30 determines the power control signal depends upon the link characteristic that base station 30 uses as the determination of link quality. For example, base station 30 may determine the power control signal in accordance with received power or alternatively in accordance with frame error rate. The present invention is equally applicable to any link quality factors.

If the link quality factor used is received power, then the signal from mobile station 50 received at base station 30 by antenna 40 is provided to receiver (RCVR) 42 which provides an indication of the received power to control processor 46. If the link quality factor used is frame error rate, then receiver 42 downconverts and demodulates the signal and provides the demodulated signal to decoder 44. Decoder 44 determines an indication of error rate and provides a signal indicative of the error rate to control processor 46.

Control processor 46 compares the link quality factor provided against a threshold or set of thresholds which may be static or varying. Control processor 46 then provides the power control information to either encoder 34 or power control encoder (P.C. ENC.) 47. If the power control information is to be encoded into the data frame, then the power control data is provided to encoder 34. This method requires that an entire frame of data be processed before transmitting the power control data. Then encoded traffic data and power control data frames are then provided to transmitter (XMTR) 36. The power control data may simply overwrite portions of the data frame or may be placed in predetermined vacant positions in the transmission frame. If the power control data overwrites traffic data, then this may be corrected by forward error correction techniques at mobile station 50.

In implementations that process a full frame of data before providing the power control data, a delay is caused which is undesirable in fast fade conditions. An alternative is to provide the power control data directly to transmitter 36 where it may be punctured into the outgoing data stream. If the power control data is transmitted without error correction coding then power control encoder 47 simply passes the power control data to transmitter 36. If error correction coding is desired for the power control data, without incurring the delay of waiting for a full frame of data to be processed, then power control encoder 47 provides an encoding of the power control data without regard to the outgoing traffic data. Transmitter 36 upconverts, modulates the signal and provides it to antenna 38 for transmission.

The transmitted signal is received at antenna 52 and provided to receiver (RCVR) 54 where it is downconverted and demodulated. If the power control data is encoded with a full frame of traffic data then the traffic and power control data is provided to decoder 56. Decoder 56 decodes the signal and separates the power control signal from the traffic data.

If, on the other hand the power control data is not encoded with a full frame of data but rather punctured into the transmission stream of data, then receiver 54 extracts the power control data from the incoming data stream and provides the encoded data to power control decoder (P.C. DEC.) 55. If the power control data is encoded, then power control decoder 55 decodes the power control data and provides the decoded power control data to control processor 58. If the power control data is not encoded then the data is provided directly from receiver 54 to control processor 58. The power control signal is provided to control processor 58, which in accordance with the power control signal provides a signal to transmitter 64 indicative of a modified transmission power level.

In one exemplary implementation of providing a rate dependent power control signal, multiple bits of power control information may be provided from base station 30 to mobile station 50. In a first multiple bit power control signal implementation received power is used as the link quality factor. Receiver 42 provides a received power measurement signal to control processor 46. Control processor 46 compares the received power value against a set of thresholds.

In an exemplary multiple bit power control signal implementation embodiment, there is one threshold indicative of a nominal received power for each rate hypothesis. Control processor 46 provides a signal indicative of where within a range of power quantization levels the received power lies. The required power for the full-rate mode will be highest, and the required power for the ⅛-rate mode will be lowest. For example, the following 5 levels can be defined:

Level 4—received power larger than the nominal full-rate power

Level 3—received power between the ½-rate and full-rate nominal powers

Level 2—received power between the ¼-rate and ½-rate nominal powers

Level 1—received power between the ⅛-rate and ¼-rate nominal powers

Level 0—received power less than the ⅛-rate nominal power.

Bits indicating the received power level are then combined with traffic data in encoder 34 and transmitted back to mobile station 50 as previously described. In this implementation, 3 bits are needed to send back this 1-of-5 information. This increases the overhead on the feedback link.

One way of reducing the amount of overhead necessary for power control in a variable rate system would be to restrict the number of allowed rate transitions for frames of data generated by data source 60 to a number that is of the form $2^n-1$ where n is an integer. For example, if one restricts a rate transition set to containing only 3 possible rate transitions, then 2 bits would be needed to transmit the received power level as opposed to three bits if all four rates were possible. In Table 2 below is listed an exemplary list of allowed rate transitions. In the first column is the rate of the previous frame and in the following three columns are the three possible rates of the current frame.

TABLE 1

| | Allowed Rate Transitions | | |
|---|---|---|---|
| $RATE_{i-1}$ | HYPOTHESIS$_1$ | HYPOTHESIS$_2$ | HYPOTHESIS$_3$ |
| full | full | half | quarter |
| half | full | half | quarter |
| quarter | full | quarter | eighth |
| eighth | full | half | eighth |

This reduction in the possible rate transitions, reduces the amount of power control overhead that must be expended. For example, if the previous frame rate ($RATE_{i-1}$) was a full rate frame, then the four levels the received signal needs to be quantized to include (1) a level greater than the nominal full rate received signal, (2) a level less than the nominal received full rate signal but greater than the nominal half rate received signal, (3) a level less than the nominal received half rate signal but greater than the nominal quarter rate received signal, and (4) a level less than the nominal quarter rate received signal. The received power can be quantized to these four levels using only two bits of information instead of three bits in a system where no transition restrictions occur.

Mobile station 50 upon receiving the power control bits specifying the level may adjust the transmission in a predetermined fashion simply dictated on the quantized power level being above or below the nominal received power level for the rate at which the signal was transmitted. In an exemplary embodiment, mobile station 50 would determine whether the power control bits specifying the received level indicate the transmission power is too high or too low. If the transmission power is too high, then the power level of transmissions is reduced by 1 dB. If, on the other hand, it is indicated by the power control bits that the transmission power is too low, then the transmission power is increased by 1 dB.

In a preferred embodiment, mobile station 50 would adjust the signal by varying amounts in accordance with the quality level indicated by the power control bits. For example if the transmission rate is eighth rate and the quality index of the power control bits indicate that the received power exceeds the nominal received power for a full rate frame then mobile station 50 should decrease the transmission power by more than the amount of decrease in the case where the transmission rate is eighth rate and the quality index of the power control bits indicates that the received power lies between the nominal received power for an eight rate frame and a quarter rate frame. Table 2 illustrates the variable transmission power adjustment based on received quality level.

TABLE 2

| Power Adjustments with Five Quality Levels | | | | |
|---|---|---|---|---|
| Received | Power Adjustment in dB | | | |
| Quality Level | Full Rate | ½ Rate | ¼ Rate | ⅛ Rate |
| 4 | −1 | −2 | −2 | −2 |
| 3 | +1 | −1 | −2 | −2 |
| 2 | +2 | +1 | −1 | −2 |
| 1 | +2 | +2 | +1 | −1 |
| 0 | +2 | +2 | +2 | +1 |

In an alternative embodiment of a capacity efficient power control system, base station 30 transmits back single bit power control signals based upon a rate hypothesis. In such a system the single bit indicates an adjustment based upon a rate hypothesis. For example the base station may transmit back a signal bit that indicates that if the frame is at half rate, then the signal should be increased.

Mobile station 30, in response would know the rate of the frame and determine if any action can be taken based upon the power control signal. It is not necessary that the rate of the hypothesis be identical to the rate of the transmitted frame for action to be taken. For example in the case where the power control signal indicates that the signal should be increased if the frame is at half rate, then if the signal is in fact at quarter or eighth rate the signal should also be increased preferably in accordance with Table 2.

In systems where individual power control bits are fed back to mobile station 50, for different rate hypothesis it is possible to increase the efficiency of the power control system by allocating the number of power control bits provided in accordance with the statistical probability of a given rate hypothesis. Coupling this means of allocating power control bits with an analysis of the perceptual effects of the power control bits gives a maximally efficient power control system.

In a zeroth order model, power control bits would simply be allocated on the probability of frame being of a given rate without any history of the frame. In the variable rate coder of the abovementioned patent application Ser. No. 08/004,484, the most likely rates at which output frames are provided are full rate frames and eighth rate frames. Eighth rate frames make up approximately 65% of the total frames provided by the coder and full rate frames make up approximately 35% of the total frames provided by the coder. Because full or eighth rate frames are the most likely, then the power control system would simply allocate more of the available power control bits toward these hypotheses.

In a first order model, the power control system would look at the previous frame and allocate available power control bits based on the probabilities of the current frame conditioned on the rate of the previous frame. Since strings of full rate frames and eighth rate frames are common in speech coders of the type described in the aforementioned U.S. patent application Ser. No. 08/004,484, the power control system of the present invention can take advantage of these conditional probabilities. For example, because long strings of full rate coded speech are common, if the power control system knew that previous frame was coded at full rate, it could allocate a large fraction of the power control bits to the hypothesis that the current frame is encoded at full rate.

In a second order model, the power control system could examine the rates of the previous two frames of data and allocate power control bits accordingly. As the order of the model grows the complexity becomes overly burdensome. However, in the case where the previous frame was one of the intermediate rates (i.e. half rate or quarter rate) such a model could be used to determine if the rates are increasing or decreasing. A hybrid of a first and second order model would provide additional certainty as to the rate of the current frame when the previous frame was transmitted at an intermediate or possibly transitory rate.

In an alternative system for allocating power control bits, the system would take into account the perceptual effects of power control on frames of a given rate. For example in an eighth rate frame, where there is redundancy of order eight power control may not be as critical as to a full rate frame with no redundancy. In a fast fade environment, it is possible for portions of a frame to be lost due to fades while other portions of the frame escape damage.

In frames that contain redundancy, power control is not as essential because the receiver can determine the information in the lost portion of the frame from its repeated counterparts in other parts of the frame. Therefore, more power control bits should be allocated to rate hypotheses which are more perceptually susceptible to poor power control than to those which are less perceptually susceptible. By combining the technique of power control bit allocation based on perceptual susceptibility with technique of power control bit allocation based on the probability of the rate hypothesis a maximally efficient method for allocating power control bits can be achieved.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a variable rate communication system wherein a first communication device for the transmission of a data packet of variable rate data in a data frame of a predetermined data capacity to a second communication device wherein when said data packet is less than said data capacity generating repeated versions of bits in said data packet and providing a first version of said data packet bits and said repeated versions of said data packet bits in said data frame and wherein in a transmission power for transmitting said data frame is scaled in accordance with said data rate, a system for controlling said transmission power of said first communication device at said second communication device comprising:

receiver means for receiving said data frame;

power measurement means for measuring power of said received data frame;

comparison means for comparing said measured power against a set of threshold values wherein each threshold value of said set of threshold values corresponds to a different rate hypothesis of a set of rate hypotheses determined in accordance with a set of allowed rate transitions to provide a power control signal; and transmitter means for transmitting said power control signal.

2. The apparatus of claim 1 wherein said comparison means is further responsive to a signal indicating a rate of each of a plurality of previous received data frames.

3. The apparatus of claim 1 wherein said comparison means is further responsive to a signal indicating a rate of a previous received data frame.

4. The apparatus of claim 1 wherein said set of allowed rate transitions comprises $2^n-1$ allowed transitions, where n is an integer.

5. The apparatus of claim 1 wherein said set of allowed rate transitions comprises 3 allowed transitions.

6. In a variable rate communication system wherein a first communication device for the transmission of a data packet of variable rate data in a data frame of a predetermined data capacity to a second communication device wherein when said data packet is less than said data capacity generating repeated versions of bits in said data packet and providing a first version of said data packet bits and said repeated versions of said data packet bits in said data frame and wherein in a transmission power for transmitting said data frame is scaled in accordance with said data rate, a system for adjusting said transmission power of said first communication device comprising:

data source means for generating frames of data at a variable data rate wherein said frames of data are generated in accordance with a set of allowed transition rates;

receiver means for receiving a power control signal;

control processor means for determining a power adjustment signal in accordance with said power control signal; and transmitter means responsive to said power adjustment signal, for transmitting each of said frames of data at a corresponding predetermined power level.

7. The apparatus of claim 6 wherein said control processor means is responsive to said set of allowed rate transitions.

8. In a variable rate communication system wherein a first communication device for the transmission of a data packet of variable rate data in a data frame of a predetermined data capacity to a second communication device wherein when said data packet is less than said data capacity generating repeated versions of bits in said data packet and providing a first version of said data packet bits and said repeated versions of said data packet bits in said data frame and wherein in a transmission power for transmitting said data frame is scaled in accordance with said data rate, a system for controlling said transmission power of said first communication device at said second communication device comprising:

receiver means for receiving said data frame;

power measurement means for measuring power of said received data frame;

comparison means for comparing said measured power against a set of threshold values wherein each threshold value of said set of threshold values corresponds to a different rate hypothesis of a set of rate hypotheses to provide a power control signal wherein said power control signal is indicative of a power adjustment command for a rate hypothesis and wherein said rate hypothesis is selected in accordance with the probability of said data frame being of a rate equal to said rate hypothesis; and transmitter means for transmitting said power control signal.

9. The apparatus of claim 8 wherein said rate hypothesis selection is further a function of a level of data packet bit repetition associated with frames transmitted at said rate hypothesis.

10. In a variable rate communication system wherein a first communication device for the transmission of a data packet of variable rate data in a data frame of a predetermined data capacity to a second communication device wherein when said data packet is less than said data capacity generating repeated versions of bits in said data packet and providing a first version of said data packet bits and said repeated versions of said data packet bits in said data frame and wherein in a transmission power for transmitting said data frame is scaled in accordance with said data rate, a system for adjusting said transmission power of said first communication device comprising:

receiver means for receiving a power control signal for a rate hypothesis;

control processor means for determining a power adjustment signal in accordance with said power control signal and with a predetermined rate hypothesis format determining the rate of said rate hypothesis and wherein said rate hypothesis format is determined in accordance with the data frame having been transmitted at a rate equal to the rate hypothesis to provide a transmitter adjustment signal; and transmitter means responsive to said transmitter adjustment signal, for transmitting said data frame at a predetermined power level.

11. In a variable rate communication system wherein a first communication device for the transmission of a data packet of variable rate data in a data frame of a predetermined data capacity to a second communication device wherein when said data packet is less than said data capacity generating repeated versions of bits in said data packet and providing a first version of said data packet bits and said repeated versions of said data packet bits in said data frame and wherein in a transmission power for transmitting said data frame is scaled in accordance with said data rate, a method for controlling said transmission power of said first communication device at said second communication device comprising the steps of:

receiving said data frame;

measuring power of said received data frame;

comparing said measured power against a set of threshold values wherein each threshold value of said set of threshold values corresponds to a different rate hypothesis of a set of rate hypotheses determined in accordance with a set of allowed rate transitions to provide a power control signal; and transmitting said power control signal.

12. The method of claim 11 wherein said step of comparing is responsive to a signal indicating a rate of each of a plurality of previous received data frames.

13. The method of claim 11 wherein said step of comparing is responsive to a signal indicating a rate of a previous received data frame.

14. The method of claim 11 wherein said set of allowed rate transitions comprises $2^n-1$ allowed transitions, where n is an integer.

15. The method of claim 11 wherein said set of allowed rate transitions comprises 3 allowed transitions.

16. In a variable rate communication system wherein a first communication device for the transmission of a data packet of variable rate data in a data frame of a predetermined data capacity to a second communication device wherein when said data packet is less than said data capacity generating repeated versions of bits in said data packet and providing a first version of said data packet bits and said repeated versions of said data packet bits in said data frame and wherein in a transmission power for transmitting said data frame is scaled in accordance with said data rate, a method for adjusting said transmission power of said first communication device comprising the steps of:

determining a current data rate of a plurality of variable data rates in accordance with a set of allowed transition rates;

generating frames of data at said current data rate;

receiving a power control signal;

determining a power adjustment signal in accordance with said power control signal;

determining a transmit power level in response to said power adjustment signal; and transmitting said frames of data at said power level.

17. The method of claim 16 wherein said step of determining a power adjustment signal is responsive to said set of allowed rate transitions.

18. In a variable rate communication system wherein a first communication device for the transmission of a data packet of variable rate data in a data frame of a predetermined data capacity to a second communication device wherein when said data packet is less than said data capacity generating repeated versions of bits in said data packet and providing a first version of said data packet bits and said repeated versions of said data packet bits in said data frame and wherein in a transmission power for transmitting said data frame is scaled in accordance with said data rate, a method for controlling said transmission power of said first communication device at said second communication device comprising the steps of:

receiving said data frame;

measuring power of said received data frame;

comparing said measured power against a set of threshold values wherein each threshold value of said set of threshold values corresponds to a different rate hypothesis of a set of rate hypotheses to provide a power control signal wherein said power control signal is indicative of a power adjustment command for a rate hypothesis and wherein said rate hypothesis is selected in accordance with the probability of said data frame being of a rate equal to said rate hypothesis;

transmitting said power control signal.

19. The method of claim 18 wherein said rate hypothesis selection is further a function of a level of data packet bit repetition associated with frames transmitted at said rate hypothesis.

20. In a variable rate communication system wherein a first communication device for the transmission of a data packet of variable rate data in a data frame of a predetermined data capacity to a second communication device wherein when said data packet is less than said data capacity generating repeated versions of bits in said data packet and providing a first version of said data packet bits and said repeated versions of said data packet bits in said data frame and wherein in a transmission power for transmitting said data frame is scaled in accordance with said data rate, a method for adjusting said transmission power of said first communication device comprising the steps of:

receiving a power control signal for a rate hypothesis;

determining a power adjustment signal in accordance with said power control signal and with a predetermined rate hypothesis format determining the rate of said rate hypothesis and wherein said rate hypothesis format is determined in accordance with the data frame having been transmitted at a rate equal to the rate hypothesis to provide a transmitter adjustment signal;

determining a power level in response to said transmitter adjustment signal; and transmitting said data frame at said power level.

21. In a variable rate communication system wherein a first communication device for the transmission of a data packet of variable rate data in a data frame of a predetermined data capacity to a second communication device wherein when said data packet is less than said data capacity generating repeated versions of bits in said data packet and providing a first version of said data packet bits and said repeated versions of said data packet bits in said data frame and wherein in a transmission power for transmitting said data frame is scaled in accordance with said data rate, a system for controlling said transmission power of said first communication device at said second communication device comprising:

a receiver for receiving said data frame and having an output;

a power measurement circuit for measuring power of said received data frame, and having an input coupled to said receiver output and having an output;

a comparison circuit having a first input coupled to said power measurement circuit output and having a second input for receiving a set of threshold values wherein each threshold value of said set of threshold values corresponds to a different rate hypothesis of a set of rate hypotheses determined in accordance with a set of allowed rate transitions and having an output to provide a power control signal in response to a comparison of said measured power value to said set of threshold values; and a transmitter having an input for receiving said power control signal, said transmitter for transmitting said power control signal.

22. The apparatus of claim 21 wherein said comparison circuit has a third input for receiving a signal indicating a rate of each of a plurality of previous received data frames.

23. The apparatus of claim 21 wherein said comparison circuit has a third input for receiving a signal indicating a rate of a previous received data frame.

24. In a variable rate communication system wherein a first communication device for the transmission of a data packet of variable rate data in a data frame of a predetermined data capacity to a second communication device wherein when said data packet is less than said data capacity generating repeated versions of bits in said data packet and providing a first version of said data packet bits and said repeated versions of said data packet bits in said data frame and wherein in a transmission power for transmitting said data frame is scaled in accordance with said data rate, a system for adjusting said transmission power of said first communication device comprising:

a variable rate data source for generating frames of data at a variable data rate wherein said frames of data are generated in accordance with a set of allowed transition rates and having an output;

a receiver having an input for receiving a power control signal and having an output;

a control processor for determining a power adjustment signal in response to said power control signal and having an input for receiving said power control signal and having an output; and a transmitter responsive to said power adjustment signal, having a first input coupled to said a variable rate data source output and having a second input coupled to said control processor output for transmitting each of said frames of data at a corresponding predetermined power level.

25. The apparatus of claim 24 wherein said control processor is responsive to said set of allowed rate transitions.

* * * * *